United States Patent
Piccionelli

(10) Patent No.: US 8,025,002 B2
(45) Date of Patent: Sep. 27, 2011

(54) PLANETARY IMPACT DEFENSE SYSTEM

(76) Inventor: Gregory A. Piccionelli, Westlake Village, CA (US)

( * ) Notice: Subject to any disclaimer, the term of this patent is extended or adjusted under 35 U.S.C. 154(b) by 380 days.

(21) Appl. No.: 12/381,378

(22) Filed: Mar. 11, 2009

(65) Prior Publication Data

US 2009/0321578 A1    Dec. 31, 2009

Related U.S. Application Data

(60) Provisional application No. 61/125,356, filed on Apr. 23, 2008.

(51) Int. Cl.
*B64D 1/04* (2006.01)
(52) U.S. Cl. .......... 89/1.1; 89/1.11; 89/1.14; 244/158.4; 244/158.5; 244/158.6
(58) Field of Classification Search ............... 244/158.4, 244/158.5, 158.6; 89/1.1, 1.11, 1.14
See application file for complete search history.

(56) References Cited

U.S. PATENT DOCUMENTS

| | | | | |
|---|---|---|---|---|
| 5,512,743 A | * | 4/1996 | Shaffer et al. | 250/203.6 |
| 6,149,103 A | * | 11/2000 | Salvatore et al. | 244/158.5 |
| 7,669,802 B2 | * | 3/2010 | Dorman | 244/158.1 |

* cited by examiner

*Primary Examiner* — J. Woodrow Eldred

(57) ABSTRACT

A system for defending a planet having a satellite against impact from an incoming body includes an explosive system and a propulsion system. The explosive system is adapted for deployment on the satellite and detonation thereon with sufficient explosive force to produce at least one ejectum to which is imparted a velocity increment sufficient for the ejectum to exceed the satellite's escape velocity and enter orbit about the planet. The propulsion system is adapted to be secured to at least one ejectum and impart a velocity increment to the ejectum sufficient to leave orbit about the planet and enter an orbit intercepting the incoming body.

The system is used in a planetary defense method in which the explosive system is deployed at a deployment site on the satellite and detonated to produce at least one ejectum having a velocity that exceeds the escape velocity of the satellite. The ejectum enters into orbit around the planet, at which time the propulsion system is secured to the ejectum to produce a projectile. The propulsion system is then activated to increase the velocity of the projectile, causing the projectile to enter into an intercept orbit targeting the incoming body and subsequently intercept and impact the incoming body. The impact prevents the incoming body from impacting the planet.

9 Claims, 2 Drawing Sheets

PLANETARY IMPACT DEFENSE SYSTEM

This application is based on U.S. Provisional Patent Application Ser. No.61/125,356, filed Apr. 23, 2008, the entire disclosure of which is incorporated herein by reference.

FIELD OF THE INVENTION

The present invention relates to a method and system for defending a planet against impacts from incoming bodies, such as asteroids or comets.

BACKGROUND OF THE INVENTION

Planets, as well as their satellites, are subject to periodic impacts by objects of various sizes, from dust and small particles to comets and asteroids. Evidence of such impacts is readily apparent in the form of craters, and such impacts have also been observed, for example the 1994 impact of Comet Shoemaker-Levy into the planet Jupiter. The effects of such impacts can be devastating. One such impact is thought to have led to the extinction of the dinosaurs at the end of the Cretaceous period. A similar impact today could potentially end human civilization, or even lead to the extinction of the human race.

In view of the threat such impacts pose to human existence, a clear need exists for methods and systems capable of defending a planet, such as Earth, from impacts from incoming bodies. Proposed methods such as launching missiles armed with nuclear warheads, however, while potentially effective, require escape from Earth's gravity well, which constrains the effective payload and/or velocity of the missiles.

SUMMARY OF THE PREFERRED EMBODIMENTS

In accordance with one aspect of the present invention, there is provided a system for defending a planet having a satellite against impact from an incoming body. The system includes an explosive system and a propulsion system. The explosive system is adapted for deployment on the satellite and detonation thereon with sufficient explosive force to produce at least one ejectum to which is imparted a velocity increment sufficient for the ejectum to exceed the satellite's escape velocity and enter orbit about the planet. The propulsion system is adapted to be secured to at least one ejectum and impart a velocity increment to the ejectum sufficient to leave orbit about the planet and enter an orbit intercepting the incoming body.

In particular embodiments, the explosive system includes at least one nuclear device.

In accordance with another aspect of the present invention, there is provided a method of defending a planet having a satellite against impact from an incoming body. The method includes the steps of: deploying an explosive system at a deployment site on the satellite; detonating the explosive system to produce at least one ejectum having a velocity that exceeds the escape velocity of the satellite, whereby the ejectum enters into orbit around the planet; securing a propulsion system to the ejectum to produce a projectile; activating the propulsion system to increase the velocity of the projectile, whereby the projectile enters into an intercept orbit targeting the incoming body; and intercepting and impacting the incoming body with the projectile, whereby the incoming body is prevented from impacting the planet.

In particular embodiments, the deployment site is located on the surface of the satellite. In other particular embodiments, the deployment site is located under the surface of the satellite. In very particular embodiments, the deployment site is located on the leading hemisphere of the satellite, more specifically at a point in the orbital plane of the satellite at the intersection of the orbit of the satellite about the planet with the surface of satellite.

Impact of the ejectum is sufficient, in particular embodiments, to deflect the incoming body from the planet. In other particular embodiments, the impact of the ejectum is sufficient to destroy the incoming body.

Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIGS. 1-4 illustrated sequential steps in a method according to the invention of defending a planet (as illustrated, Earth) having a satellite (the Moon) from an incoming asteroid, wherein.

Like numerals refer to like parts throughout the several views of the drawings.

DETAILED DESCRIPTION OF THE PREFERRED EMBODIMENTS

As used herein, an "incoming body" denotes a massive object following an orbital trajectory that threatens to impact the planet to be defended according to the invention, in particular an incoming body having an extra-planetary origin, such as an asteroid, comet or the like. A "satellite" as used herein denotes a body in orbit around the planet to be defended. Exemplary satellites include the Moon; Phobos, Deimos (in methods for defending Mars); Io, Europa, Ganymede, Callisto (in methods for defending Jupiter); etc. In particular embodiments, the satellite is a natural body, such as the satellites listed above. In alternative embodiments, the satellite is an artificial structure having a mass comparable to such a natural body.

Figure 1:
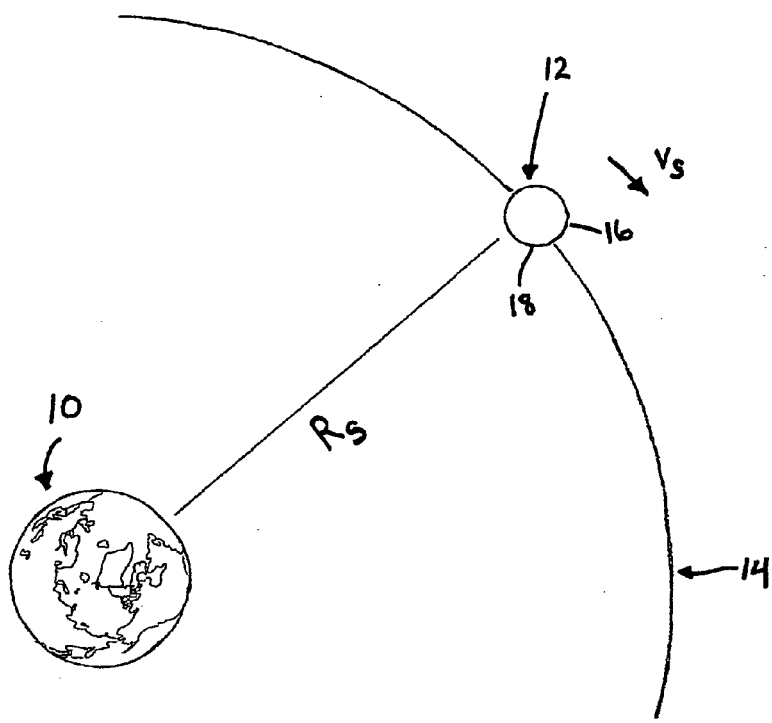
FIG. 1 is an illustration of a first step in which an explosive system is deployed at a deployment site on the satellite's surface and positioned to take advantage of the satellite's orbital velocity.

Referring to FIG. 1, a planet 10, such as Earth, is orbited by a satellite 12, such as the Moon, orbiting planet 10 in orbit 14 at a mean distance $R_s$ with a mean orbital velocity $v_s$. Explosive system 16, which can comprise, for example, one or more nuclear devices and/or one or more conventional explosive devices, is deployed at a point 18 on or beneath the surface of satellite 12. Point 18 is located, in particular embodiments, on the leading hemisphere of satellite 12 (i.e., the hemisphere facing in the direction of orbital motion), and in more particular embodiments a point in the orbital plane of satellite 12 at or near the intersection of orbit 14 with the surface of satellite 12.

Figure 2:
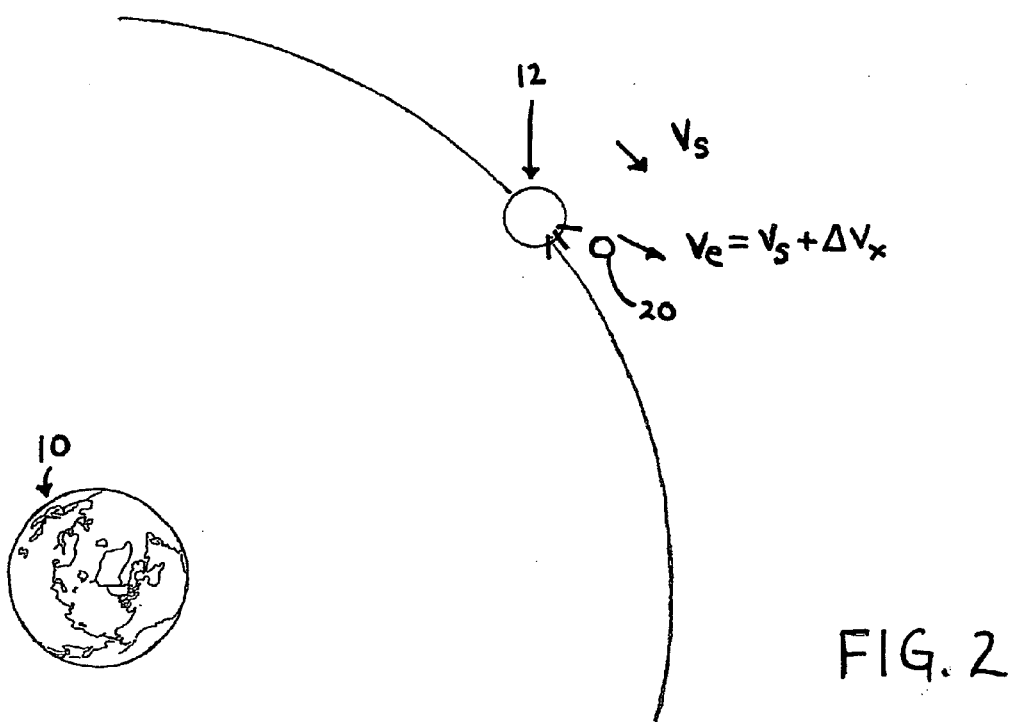
FIG. 2 is an illustration of a second step in which the explosive system is detonated to produce ejecta having a velocity that exceeds the satellite's escape velocity, whereby the ejecta enter into orbit around the planet.
Figure 3:
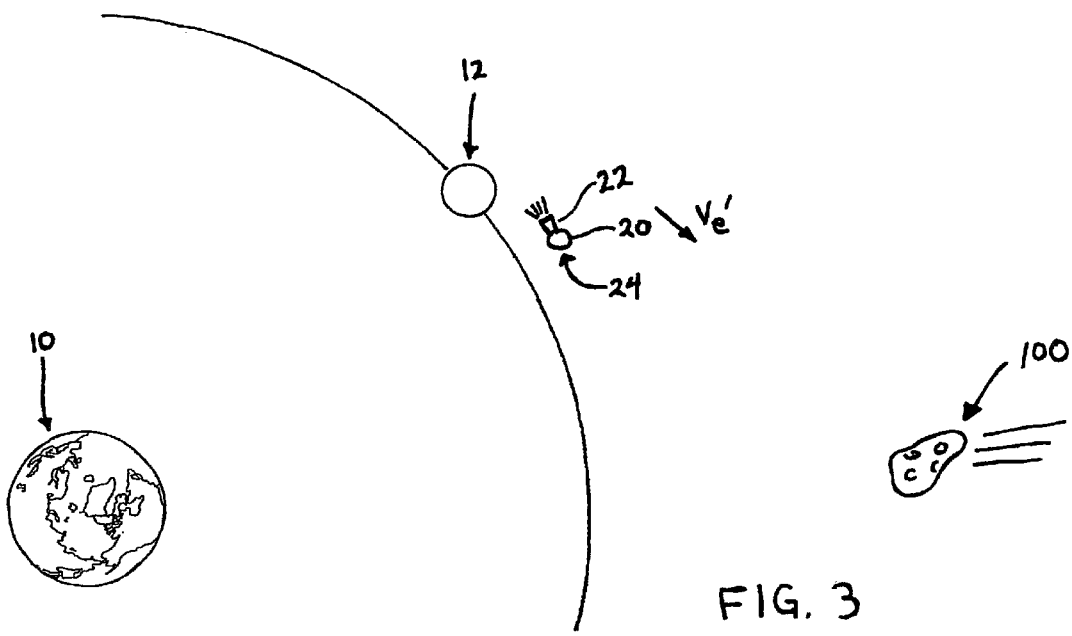
FIG. 3 is an illustration of a third step in which a propulsion system is secured to an ejectum produced in FIG. 2 to produce a projectile, and then activated to increase the velocity of the projectile, whereby the projectile enters into an intercept orbit targeting the incoming asteroid.
Figure 4:
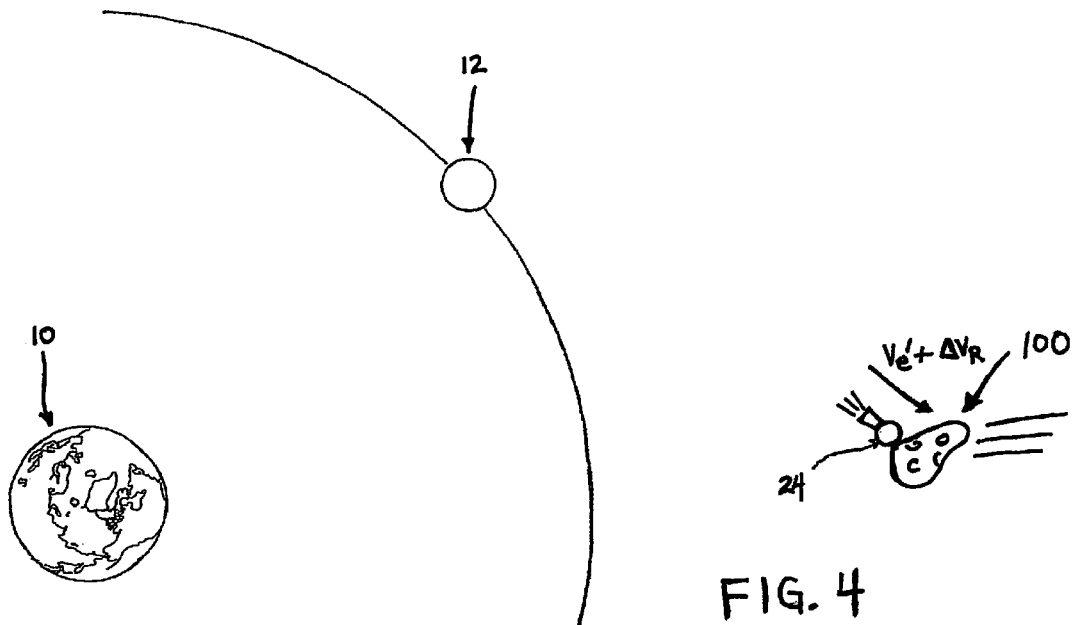
FIG. 4 is an illustration of a fourth step in which the projectile intercepts and impacts the incoming asteroid, thereby deflecting or destroying it and preventing the asteroid from impacting the planet.

In FIG. 2, explosive system 16 is detonated. Detonation of explosive system 16 results in formation of a plurality of ejecta (one such ejectum 20 is illustrated), and releases sufficient explosive force to impart to at least one such ejectum a velocity increment $\Delta v_x$ exceeding the satellite's escape velocity $v_{escape,s}$. As shown, ejectum 20 thus escapes from satellite 12 and enters into orbit about planet 10 with orbital velocity $v_e$ greater than $v_s$.

Once ejectum 20 enters into orbit about planet 10, propulsion system 22 is affixed thereto, for example by a remotely controlled vehicle or a manned mission. Propulsion system 22 comprises one or more devices capable of altering the velocity of ejectum 20, including without limitation, chemical, ion and nuclear propulsion devices, together with appropriate fuel supplies, control systems, power systems, guidance systems, etc. required for propulsive function. Ejectum 20 together with propulsion system 22 constitute projectile 24, having an orbital velocity $v_e' \approx v_e$.

One or more projectiles 24 thus become available as for use as defensive measures against any incoming body 100, such as an asteroid or comet, which threaten to impact planet 10. To defend planet 10 against impact, propulsion system 22 is activated in order to increase the velocity $v_e'$ of projectile 24 by an amount $\Delta v_p$, thereby altering the orbit of projectile 24 in order to impact projectile 24 against incoming body 100 at a desired safe distance from planet 10 and thus alter the orbit of, or disrupt or destroy, incoming body 100 prior to impacting planet 10.

The inventive defense system thus takes advantage of the orbital velocity of satellite 12 in order to create and deploy projectiles having orbital velocities based on the satellite's orbital velocity. The satellite's orbital velocity so imparted to the projectiles increases the kinetic energy of the projectiles above that which would be achieved based on the velocity increment produced by the projectiles' propulsion systems. This increased kinetic energy enhances the effect of the projectiles' impacts on the incoming body.

I claim:

1. A system for defending a planet having a satellite against impact from an incoming body, the system comprising:
    a) an explosive system, the explosive system being adapted for deployment on the satellite and detonation thereon with sufficient explosive force to produce at least one ejectum to which is imparted a velocity increment sufficient for the ejectum to exceed the satellite's escape velocity and enter orbit about the planet, and
    b) a propulsion system adapted to be secured to at least one ejectum and impart a velocity increment to the ejectum sufficient to leave orbit about the planet and enter an orbit intercepting the incoming body.

2. The system of claim 1 wherein the explosive system comprises at least one nuclear device.

3. A method of defending a planet having a satellite against impact from an incoming body, the method comprising the steps of:
    i) deploying an explosive system at a deployment site on the satellite,
    ii) detonating the explosive system to produce at least one ejectum having a velocity that exceeds the escape velocity of the satellite, whereby the ejectum enters into orbit around the planet,
    iii) securing a propulsion system to the ejectum to produce a projectile,
    iv) activating the propulsion system to increase the velocity of the projectile, whereby the projectile enters into an intercept orbit targeting the incoming body, and
    v) intercepting and impacting the incoming body with the projectile, whereby the incoming body is prevented from impacting the planet.

4. The method of claim 3 wherein the deployment site is located on the surface of the satellite.

5. The method of claim 3 wherein the deployment site is located under the surface of the satellite.

6. The method of claim 3 wherein the deployment site is located on the leading hemisphere of the satellite.

7. The method of claim 6 wherein the deployment site is located at a point in the orbital plane of the satellite at the intersection of the orbit of the satellite about the planet with the surface of satellite.

8. The method of claim 3 wherein the incoming body is deflected from the planet.

9. The method of claim 3 wherein the incoming body is destroyed.

* * * * *